No. 847,128. PATENTED MAR. 12, 1907.
M. H. SULLIVAN.
AUTOMOBILE.
APPLICATION FILED MAY 17, 1906.

2 SHEETS—SHEET 1.

WITNESSES

INVENTOR
Michael H. Sullivan
By Benj. G. Cow, Attorney

No. 847,123. PATENTED MAR. 12, 1907.
M. H. SULLIVAN.
AUTOMOBILE.
APPLICATION FILED MAY 17, 1906.

2 SHEETS—SHEET 2.

WITNESSES
INVENTOR
Michael H. Sullivan
By Benj. G. Cowl, Attorney

UNITED STATES PATENT OFFICE.

MICHAEL H. SULLIVAN, OF POUGHKEEPSIE, NEW YORK, ASSIGNOR TO ALONZO SEDGWICK, OF POUGHKEEPSIE, NEW YORK.

AUTOMOBILE.

No. 847,128.  Specification of Letters Patent.  Patented March 12, 1907.

Application filed May 17, 1906. Serial No. 317,367.

*To all whom it may concern:*

Be it known that I, MICHAEL H. SULLIVAN, a citizen of the United States, residing at Poughkeepsie, in the county of Dutchess and State of New York, have invented new and useful Improvements in Antiskidding-Gear for Automobiles, Bicycles, and other Vehicles, of which the following is a specification.

My invention is an improved antiskidding-gear for automobiles, bicycles, and other vehicles employing a driving axle-shaft and a traction wheel or wheels driven thereby, the object of the invention being to provide improved devices for automatically locking the wheels to the axle-shaft when the latter is being driven by the motor; for automatically releasing the wheels from the driving axle-shaft when the motor is stopped, so that the wheels are permitted to "coast" or turn on and independently of the axle-shaft, and thus relieve the vehicle of the braking effect which would result from turning the axle-shaft with and by the wheels and running the motor "dead," and for also automatically releasing either of the wheels from the driving axle-shaft when the speed of such wheel is required to be greater than that of such shaft, as when the vehicle is turning a corner.

My invention consists in the construction and combination of devices hereinafter described and claimed.

Figure 1:
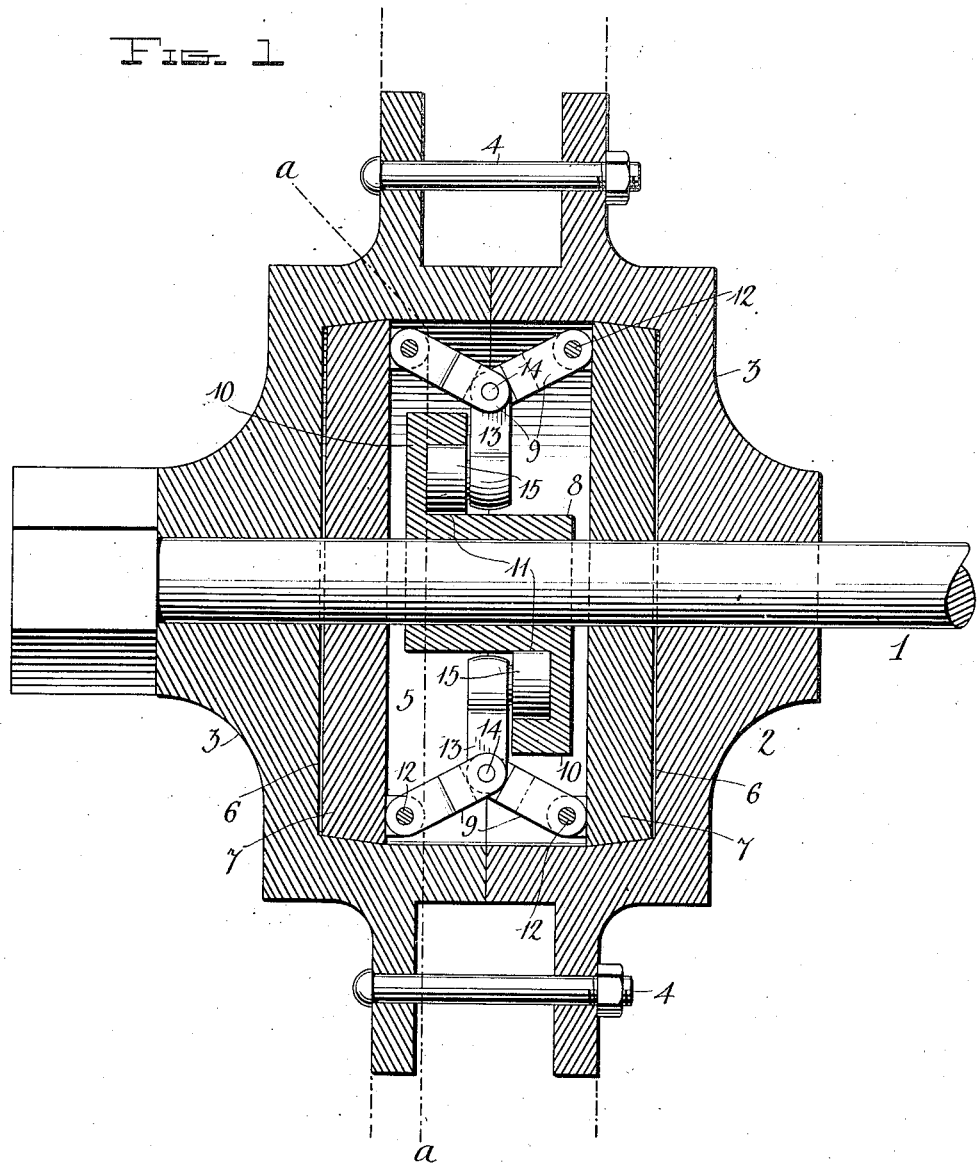
Figure 2:
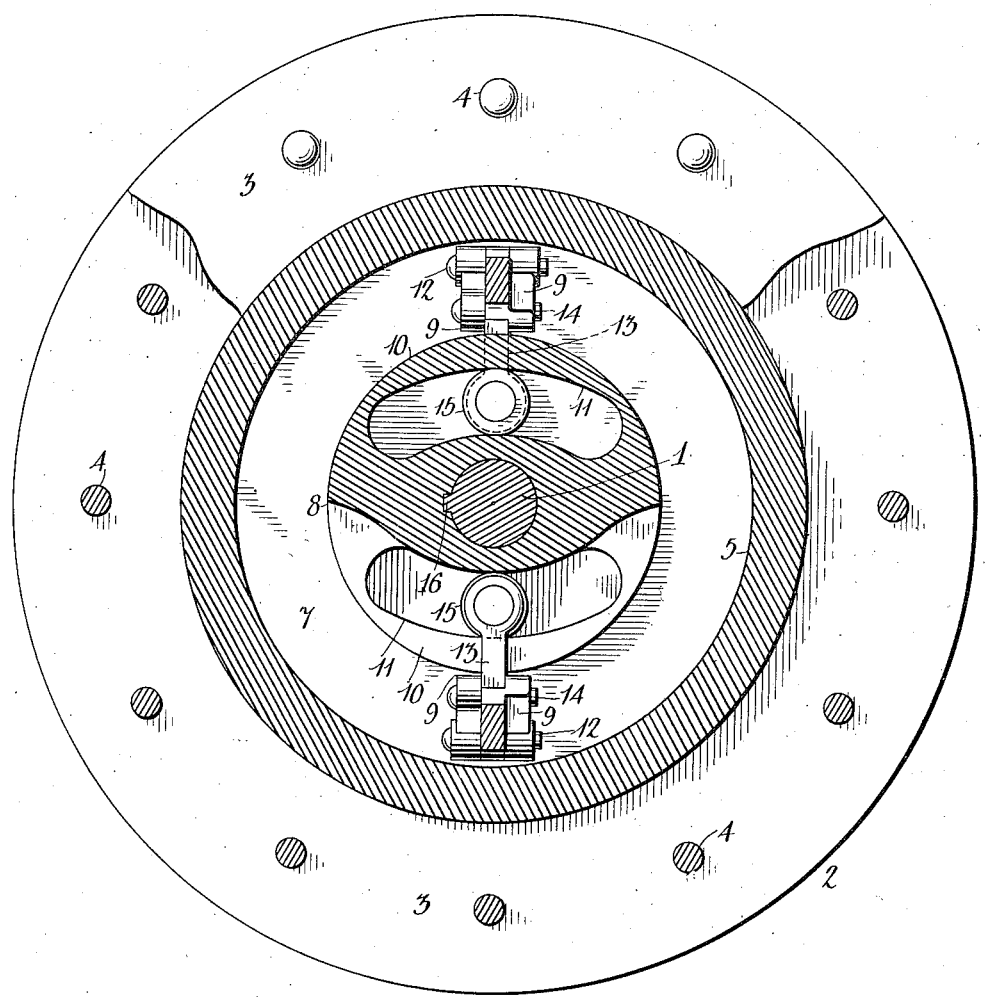

In the accompanying drawings, Figure 1 is a sectional view of a portion of an automobile driven wheel and of antiskidding-gear embodying my invention for connecting such wheel to the driving axle-shaft, the latter being shown in elevation; and Fig. 2 is a transverse sectional view of the same, taken on the plane indicated by the line *a a* of Fig. 1.

A portion of the driving axle-shaft of the automobile, bicycle, or other vehicle is indicated at 1. It may be of any suitable construction. The hub 2 of the driven wheel is here shown as formed of two separable sections 3, secured together by bolts 4 and each hollowed on its inner side, so that said hub is provided with a central cylindrical chamber 5, the end walls 6 of which form friction-surfaces, so that the hub in addition to being a hub is also a friction element of the driven wheel. The hub is loose on the axle-shaft, and in the chamber 5 and opposed to the friction-surfaces 6 thereof are friction elements 7, (here shown as circular plates,) which are movable toward and from each other, are loose on the axle-shaft, and are spaced apart.

A cam 8, which is disposed between the movable friction elements 7, is secured to the axle or driving shaft, as by a key 9. Said cam has webs 10 at its ends, each of which has a cam-slot 11. Said cam-slots are here shown as curved, the central or "dwell" portion of each slot being nearest to the axle-shaft, the end portions thereof receding from said axle-shaft.

The movable friction elements 7 are connected together at diametrically opposite points by pairs of toggle-jointed links 9, the same being pivotally connected to the friction elements 7, as at 10, an arm 11 being pivotally connected to each pair of such toggle-jointed links, as at 12, and being provided with a tappet-roller 13, which operates in one of the cam-slots. Assuming that the tappet-rollers are in the central or dwell portions of the cam-slots, the toggle-jointed ends of the links will be drawn toward the axle-shaft and said links will draw the friction elements 7 toward each other and out of contact with the friction-surfaces 6 of the hub or driven-wheel friction element, so that the wheel will be free to coast or turn on the driving axle-shaft, and this will be true if the axle-shaft is not in revolution or is being revolved at a lower rate of speed than the wheel.

If the wheel is at rest and the axle-shaft is turned in either direction by the application of the power of the motor thereto, if the device is in use on an automobile vehicle, or by the power of the rider if the device is in use on a bicycle, the angular movement of the cam and axle-shaft with reference to the wheel will cause one end portion of each of the cam-slots to act on the tappet-roller in engagement therewith, so that the arm 11 will be moved outwardly radially with reference to the axle-shaft, and the toggle-jointed links will force the friction elements 7 outwardly in opposite directions and frictionally engage such friction elements with the friction-surfaces of the hub or wheel friction element, and thereby frictionally lock the wheel to the axle-shaft, so that the wheel will be driven by the said shaft and will act as a traction-wheel to effect the propulsion of the vehicle. The same result will be secured if the wheel is revolving and the axle-shaft is started to revolve at a higher rate of speed than that of the wheel.

Having thus described my invention, what I claim as new, and desire to secure by Letters Patent, is—

1. The combination with a driving-shaft, a driven wheel loose thereon and having a friction member, a friction member movable longitudinally with relation to the shaft into and out of frictional engagement with the friction member of the driven wheel, a cam on and turned by the shaft, and means coacting with the cam and actuated by the angular movement thereof with respect to the wheel, to operate the longitudinally-movable friction member.

2. The combination of a driving-shaft, a driven wheel loose thereon and having a friction member provided with oppositely-disposed friction-surfaces, spaced apart, a cam on and turned by the shaft, friction members movable longitudinally with respect to the shaft into and out of frictional engagement with the friction-surfaces of the driven-wheel friction member, and means coacting with the cam and actuated by the angular movement thereof with respect to the wheel, to simultaneously move the longitudinally-movable friction members, for the purpose set forth.

3. The combination of a driving-shaft, a driven wheel loose thereon and having a friction member provided with opposing spaced friction-surfaces, friction members loose on and longitudinally movable with respect to the shaft into and out of engagement with the friction-surfaces of the driven-wheel friction member, a cam fast on the shaft and disposed between said longitudinally-movable friction members, toggle-jointed links connecting said members, and means, operated by the cam and connected to the said links, to operate said longitudinally-movable friction members when the shaft is turned angularly with respect to the wheel.

In testimony whereof I have signed my name to this specification in the presence of two subscribing witnesses.

MICHAEL H. SULLIVAN.

Witnesses:
JAMES E. CARROLL.
JOHN E. MACK.